(12) United States Patent
Hen et al.

(10) Patent No.: US 11,956,239 B2
(45) Date of Patent: Apr. 9, 2024

(54) IDENTITY MISCONFIGURATION DETECTION FOR ROLE-BASED ACCESS CONTROL

(71) Applicant: MICROSOFT TECHNOLOGY LICENSING, LLC, Redmond, WA (US)

(72) Inventors: Idan Hen, Tel Aviv (IL); Aharon Michaels, Beit Shemesh (IL); Dotan Patrich, Kfar Saba (IL); Josef Weizman, Haifa (IL); Amit Magen, Natanya (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 155 days.

(21) Appl. No.: 17/496,020

(22) Filed: Oct. 7, 2021

(65) Prior Publication Data

US 2023/0110080 A1 Apr. 13, 2023

(51) Int. Cl.
*H04L 29/06* (2006.01)
*G06N 20/00* (2019.01)
*H04L 9/40* (2022.01)

(52) U.S. Cl.
CPC .......... *H04L 63/101* (2013.01); *G06N 20/00* (2019.01); *H04L 63/105* (2013.01); *H04L 63/20* (2013.01)

(58) Field of Classification Search
CPC ... H04L 63/101; H04L 63/105; H04L 63/108; H04L 63/0263; H04L 63/20; H04L 63/10
USPC .......................................................... 726/4
See application file for complete search history.

(56) References Cited

U.S. PATENT DOCUMENTS

| 11,252,159 B2 * | 2/2022 | Kannan ................. H04L 63/104 |
| 2012/0101952 A1 * | 4/2012 | Raleigh ............... H04L 12/1417 |
| | | 709/223 |

* cited by examiner

*Primary Examiner* — Longbit Chai
(74) *Attorney, Agent, or Firm* — Shook, Hardy & Bacon L.L.P.

(57) ABSTRACT

Technologies are shown for detection of identity misconfiguration that involve collecting identity/role binding and role/access rules data from multiple clusters supported by a computing resource system. Access rules for identities are extracted from the collected data and an access rule prediction model created to predict access rules for identities. An identity definition request for a tenant is received having a requested identity and a role assigned to the identity. A set of access rules is obtained for the role assigned to the identity and a predicted set of access rules is obtained for the requested identity from the prediction model. The access rules for the requested role are compared to the predicted set of access rules and a misconfiguration alert generated when there is a difference between the set of access rules for the requested role and the predicted set of access rules for the requested identity.

20 Claims, 11 Drawing Sheets

IDENTITY MISCONFIGURATION DETECTION FOR ROLE-BASED ACCESS CONTROL

BACKGROUND

Remote computing resource systems, e.g. cloud services platforms, generally provide Platform as a Service (PaaS) or Infrastructure as a Service (IaaS) resources to subscriber users. For example, a tenant user subscriber is provisioned with resources on one or more servers of a remote computing resource system to store and access data, host websites, host services (e.g. email or communication services), or support user applications (e.g. word processing or database applications). Generally, users in the tenant user's domain are able to access the resources provisioned for the tenant user on the remote computing resource system through a wide area communication network, such as the internet.

However, the broad accessibility of the remote computing resource system often leads to attacks by malicious entities that attempt to access the tenant user's resources. A variety of security approaches are utilized to protect against the activity of these malicious entities.

One such security approach is Role-Based Access Control (RBAC), where access is limited to authorized users with access typically defined with respect to roles. Roles can be created for job functions, such as functions for different system users within an organization. Access permissions or rules are normally associated with roles. Access for a user can be determined by assigning a role to the user, who then obtains the permissions of their assigned role.

In RBAC models for authorization, managing identities is generally important to access security. In RBAC, identities are generally bound to defined roles. Identity can be either a human user or an application identity named service account. Roles typically have an associated set of access rules that configure the allowed behavior, such as creating a new container or list secrets.

For example, the KUBERNETES open-source container orchestration system maintained by the Cloud Native Computing Foundation utilizes an RBAC model that defines access rules for a role and assigns roles to users. Configuring the correct RBAC rules can be a challenging task in general and KUBERNETES in particular.

It is with respect to these and other technical challenges that the disclosure made herein is presented.

SUMMARY

The disclosed technology generally shows methods, media and systems for detection of identity misconfiguration in a remote computing resource provider system.

In particular examples in accordance with the disclosed technology for detection of identity misconfiguration in a remote computing resource provider system, the disclosed technology involves collecting identity to role binding data and role to access rules data from multiple clusters supported by the remote computing resource provider system and, for each of one or more identities in the collected identity to role binding data, extracting a set of access rules for each identity from the identity to role binding data and role to access rules data collected from the multiple clusters, and creating an access rule prediction model from the sets of access rules extracted for the one or more identities from the identity to role binding data and role to access rules data collected from the multiple clusters to predict access rules for identities.

These examples also involve receiving an identity definition request for a tenant, the identity definition request having a requested identity and a role assigned to the identity, obtaining a set of access rules for the role assigned to the identity, obtaining a predicted set of access rules for the requested identity from the access rule prediction model, comparing the set of access rules for the requested role to the predicted set of access rules for the requested identity, and generating an identity misconfiguration alert when there is a difference between the set of access rules for the requested role to the predicted set of access rules for the requested identity.

In certain examples, the operation of creating an access rule prediction model from the sets of access rules extracted for the identities from the identity to role binding data and role to access rules data collected from the multiple clusters to predict access rules for identities involves statistically analyzing the sets of access rules extracted for the identities from the identity to role binding data and role to access rules data collected from the multiple clusters to create a statistical access rule prediction model to statistically predict access rules for identities.

In other examples, the operation of creating an access rule prediction model from the sets of access rules extracted for the one or more identities from the identity to role binding data and role to access rules data collected from the multiple clusters to predict access rules for identities involves applying machine learning to the sets of access rules extracted for the one or more identities from the identity to role binding data and role to access rules data collected from the multiple clusters to create a machine learning access rule prediction model to predict access rules for identities.

In certain of these other examples, the operation of applying machine learning to the sets of access rules extracted for the one or more identities from the identity to role binding data and role to access rules data collected from the multiple clusters to create a machine learning access rule prediction model to predict access rules for identities involves obtaining a static access rule prediction model for identities and dynamically modifying the static access rule prediction model based on the sets of access rules extracted for the one or more identities from the identity to role binding data and role to access rules data collected from the multiple clusters.

In yet other examples, the operation for generating an identity misconfiguration alert when there is a difference between the set of access rules for the requested role to the predicted set of access rules for the requested identity involves automatically reconfiguring the access rules for the requested identity.

In still other examples, the operation for generating an identity misconfiguration alert when there is a difference between the set of access rules for the requested role to the predicted set of access rules for the requested identity involves providing a message for display that indicates that the access rules for the requested identity may be misconfigured.

In particular examples, the message provided for display indicates the difference between the set of access rules for the requested role and the predicted set of access rules for the requested identity.

Other technical benefits not specifically identified herein can also be realized through implementations of the disclosed technologies. It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
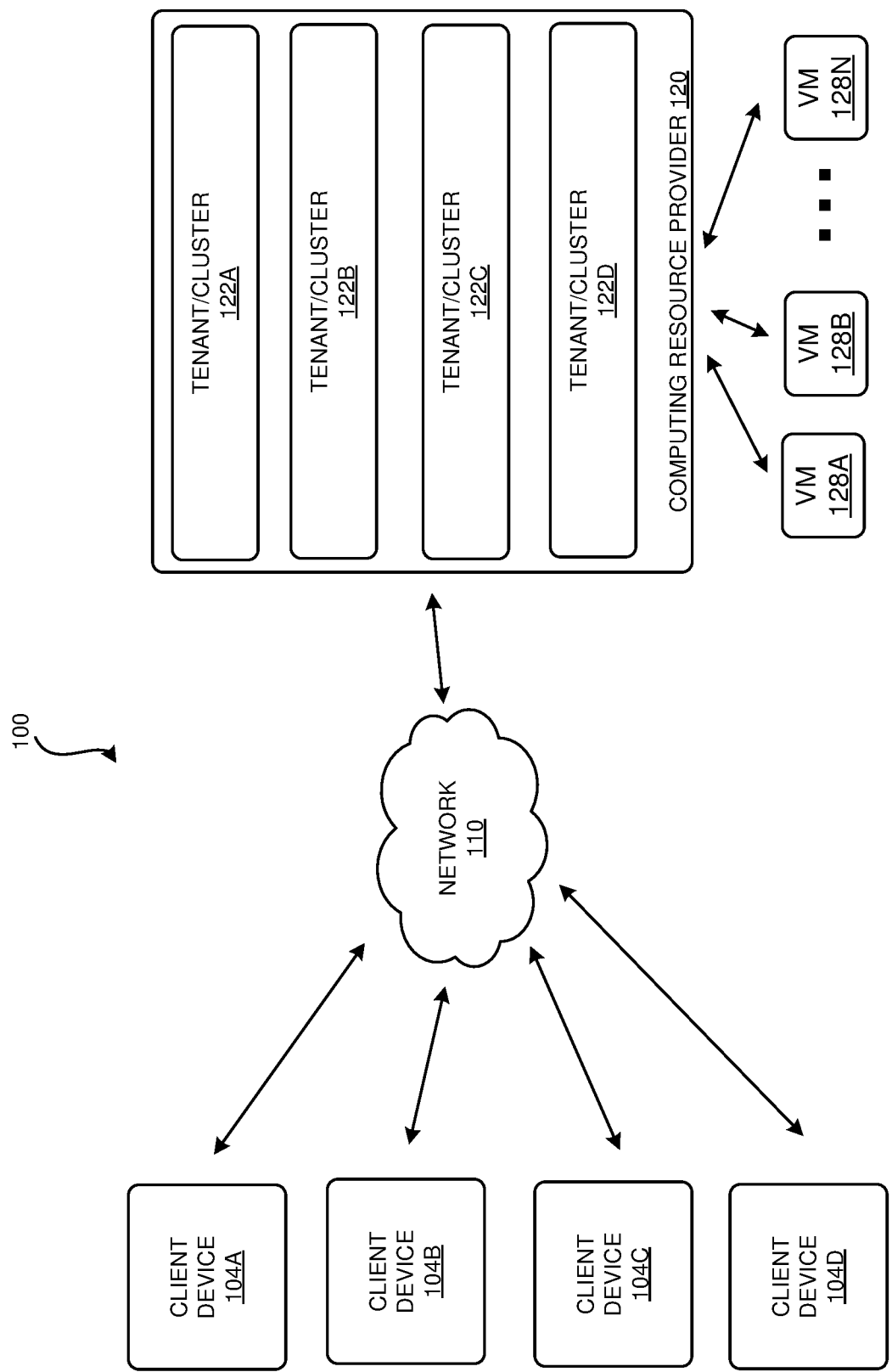
FIG. 1 is a network architecture diagram showing an illustrative computing system involving tenant/cluster domains hosted on a remote computing resource system.

The following detailed description is directed to technologies for detection of identity misconfiguration in a remote computing resource provider system.

Remote computing resource provider systems, such as cloud computing service providers or PaaS providers, typically provide computing resources to multiple subscriber users or tenants. Often, many of the tenants perform similar configuration tasks with respect to each of their domains. For example, many tenants configure their cluster resources with the same or similar systems, such as Kubernetes. Some of these systems utilize the same or similar built-in identities in different tenant domains on a remote computing resource provider system.

The disclosed technology can detect misconfiguration of an identity in one tenant domain based on configuration data from other tenant domains. In certain examples, the disclosed technology collects identity to role binding data and role to access rules data from multiple tenants supported by the remote computing resource provider system. Access rules for identities can be extracted from the data collected from the multiple tenants and used to create an access rule prediction model that can predict access rules for identities based on the extracted access rules.

When another tenant attempts to configure an identity and assigns a role for the identity, a set of predicted access rules for the requested identity can be obtain from the access rule prediction model and compared to the access rules for the assigned role. If a difference is detected between the predicted access rules and the access rules for the assigned role, then a misconfiguration alert can be generated to notify an administrator for the tenant.

The misconfiguration alert can include information identifying the detected difference, e.g. an access rule that is extra or missing from the predicted access rules. In some examples, the misconfiguration alert can reconfigure the requested identity to have the predicted access rules for the identity.

The access rule prediction model can take a variety of forms in accordance with the disclosed technology. In some examples, the model can be based on statistical analysis of the configuration data collected from the multiple tenants of the remote computing resource system. In certain of these examples, statistical information regarding the possible extra or missing access rules can be provided to the administrator for a tenant. In other examples, the model can be obtained by applying machine learning techniques to the configuration data collected from the multiple tenants of the remote computing resource system.

One technical advantage of the disclosed technology can be that it can improve computer security by detecting misconfiguration of identities that can lead to excessive access permissions for an identity. If an identity with excessive permissions is compromised by an attacker, then tenant resources can be unnecessarily exposed to risk.

Another technical advantage of the disclosed technology can be that it can improve user interactions for configuring a tenant domain by providing guidance information to an administrative user regarding potential misconfiguration of an identity and, in some examples, providing corrective information or action.

Other technical effects and advantages other than those mentioned herein can also be realized from implementation of the technologies disclosed herein.

While the subject matter described herein is presented in the general context of program modules that execute in conjunction with the execution of an operating system and application programs on a computer system, those skilled in the art will recognize that other implementations can be performed in combination with other types of program modules. Generally, program modules include routines, programs, components, data structures, and other types of structures that perform particular tasks or implement particular abstract data types. Moreover, those skilled in the art will appreciate that the subject matter described herein can be practiced with other computer system configurations, including hand-held devices, multiprocessor systems, microprocessor-based or programmable customer electronics, computing or processing systems embedded in devices (such as wearables, automobiles, home automation etc.), minicomputers, mainframe computers, and the like.

In the following detailed description, references are made to the accompanying drawings that form a part hereof, and which are shown by way of illustration specific configurations or examples. Referring now to the drawings, in which like numerals represent like elements throughout the several figures, aspects of detection of identity misconfiguration in a remote computing resource provider system will be described.

The remote computing resource system discussed herein typically provides a PaaS for a tenant user, e.g. the "cloud," by provisioning remote computer resources to perform computer processing, such as to respond to user control inputs or other data input. In some cloud computing scenarios, some operations may be implemented in one set of computing resources, such as clients and servers, and other operations may be implemented in other computing resources, such as cloud resources provided by one or more compute resource providers. A cloud computing environment may include many computer resource provider systems offered by different providers. Examples of compute resource providers include the WINDOWS AZURE Service Platform from MICROSOFT CORPORATION, the AMAZON AWS from AMAZON, INC., the GOOGLE Cloud Platform from GOOGLE INC., and platform virtualization software and services from VMWARE, INC.

FIG. 1 is a network architecture diagram showing an illustrative remote computing environment 100 involving tenant/cluster domains 122 hosted on a remote computing resource provider system 120. In remote computing environment 100, user client computing devices 104 interact with tenants/clusters 122 hosted on remote computing resource system 120 through network 110. Client devices 104 can be personal computers, laptop computers, tablet computers, or smart phones, and or servers, such as servers operated and maintained by an entity on their own premises, or applications thereon that operate in combination with tenants/clusters 122.

In the example of FIG. 1, remote computing resource system 120 can be configured to provide application services through tenants/cluster 122 to users of computing devices 104, such as email messaging, text messaging, remote applications, remote storage, etc., through network 110. For example, a user with a user account in a subscribed tenant user domain on a tenant/cluster 122 can login to the tenant/cluster 122 on remote computing resource system 120 through network 110 in order to utilize an email service.

Remote computing resource system 120, in this example, supports one or more tenants/clusters 122 that subscribe to the system 120 and are each provisioned with a PaaS subscription environment. Based on the nature of each subscription, the remote computing resource system 120 can provision resources, such as virtual machines (VMs) 128 to provide a platform for each tenant/cluster to support users in the tenant's domain. For example, application services can be provisioned in the tenant's domain or cluster to support user applications, such as email, word processing or browser applications in a client 104. Remote computing resource system 120 can provision other resources for serving tenant/clusters 122, such as data storage for storing tenant user data.

An attacker can also utilize a computing device 104 to attempt to login to or access the resources of remote computing resource system 120 through network 110. For example, in a brute force attack technique, an attacker will repeatedly try to login to the remote computing resource system with a variety of user names or account identifiers and passwords with the intent of finding a set of credentials, e.g. user name and password combination, that allows them to access an account. Automated techniques have been developed by attackers to generate and attempt login with large numbers of user name and password combinations.

An attacker will typically use remote access tools to access many different resources and data of the tenant user domains supported by the remote computing resource system 120. For instance, the attacker may attempt to access data in domain controllers to discover accounts and obtain access to resources and files for the accounts. An attacker may also search for credentials and secrets for the tenant user domain that are stored on remote computing resource system 120.

Figure 2:
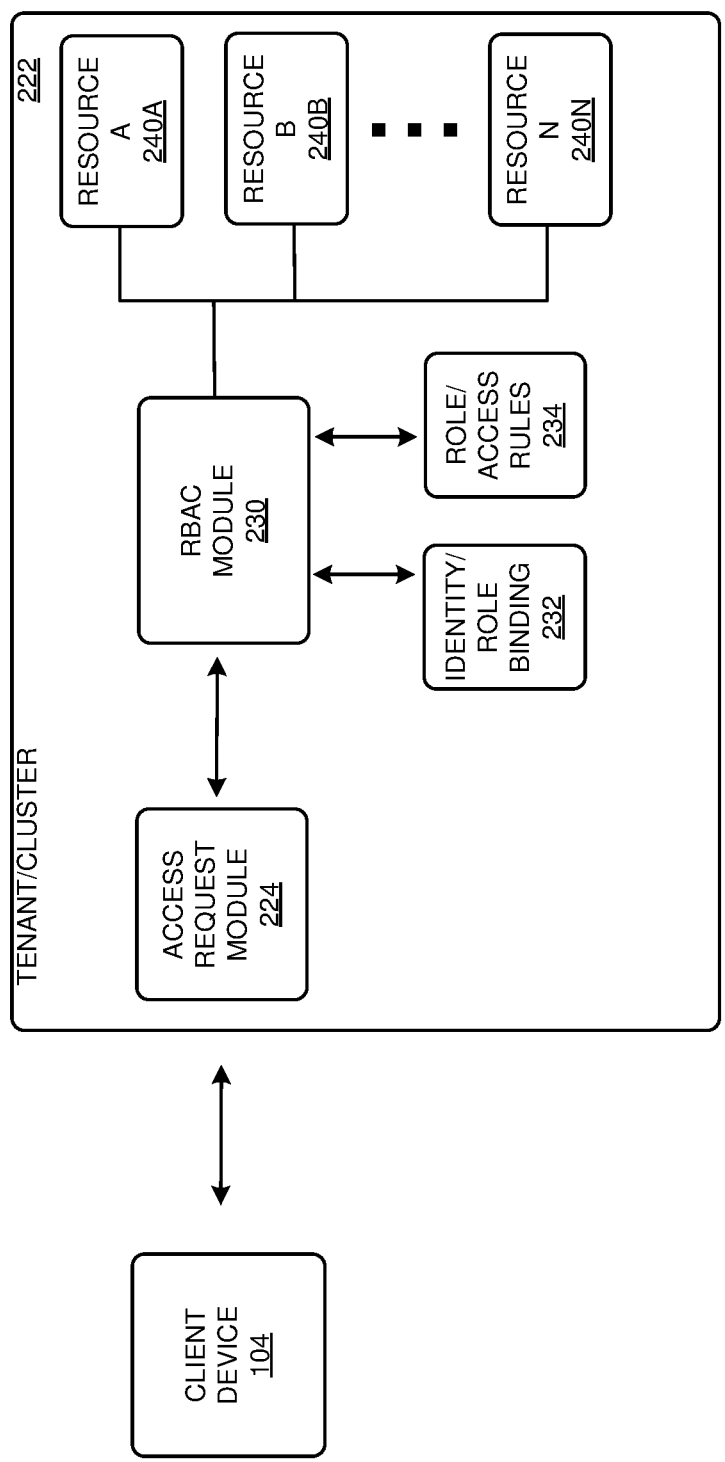
FIG. 2 is a functional block diagram illustrating an example of access control for a tenant/cluster in a remote computing resource system.

One approach to reducing the security risk of attackers gaining control of a user identity is RBAC that limits the access privileges of a user based on a role assigned to the user by and administrator of a tenant cluster. FIG. 2 is a functional block diagram illustrating a generalized example of access control model 200 for role-based access control in a tenant/cluster 222 on a remote computing resource system.

In the example of FIG. 2, access requests from a client device 104 are received and managed by an access request module 224 in a tenant/cluster 222. Requests are vetted by RBAC module 230, which performed rule-based access control based on the identity from which the access request is received. RBAC module 230 determines a role corresponding to the identity from identity/role binding data store 232. RBAC module 230 obtains the access rules corresponding to the role from role/access rules store 234. The access rules for the role determine which of resources 240 that the role can access, which, by extension of the role assigned to the identity, determines the resources that the identity can access.

Figure 3:
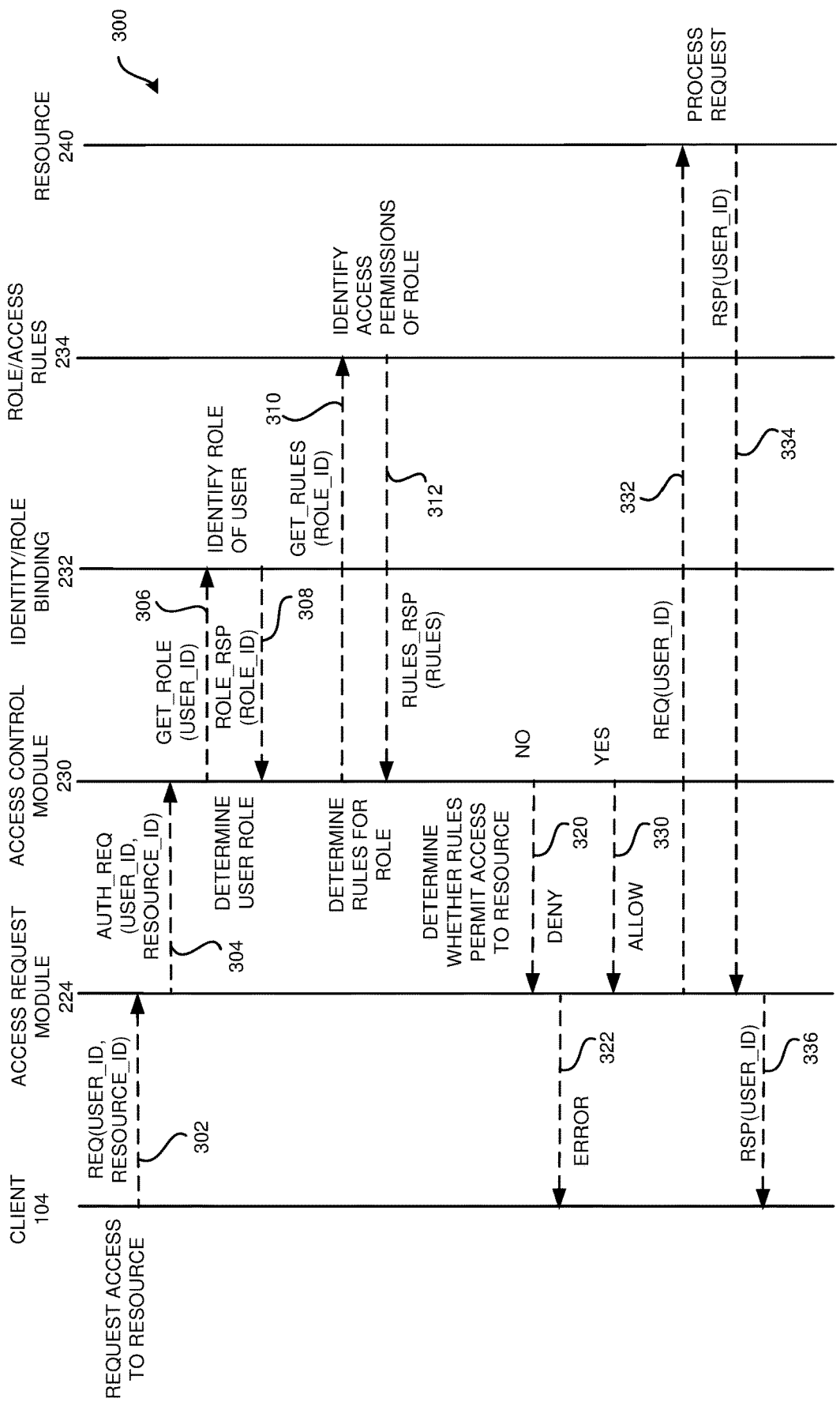
FIG. 3 is a messaging diagram illustrating an example of a message and data exchange in response to a resource request in the example RBAC system of FIG. 2.

FIG. 3 is a messaging diagram illustrating an example of a message and data exchange 300 in response to a resource request in the example RBAC system of FIG. 2. In this example, a user or application identity USER_ID in client 104 sends an access request 302 for a resource RESOURCE_ID, which is received at access request module 224. Access request module 224 responds to the access request 302 by sending an access authorization request 304 with USER_ID and RESOURCE_ID to access control module 230.

Access control module 230 responds to authorization request 304 by getting a role for the identity by requesting, in GET_ROLE 306, the role ROLE_ID assigned to the identity USER_ID from identity role binding store 232. The ROLE_ID is received in role response ROLE_RSP 308.

Access control module 230 utilizes the ROLE_ID corresponding to the USER_ID to get the access rules that are defined for the role by requesting, in GET_RULES 310, the access permission for the role ROLE_ID assigned to the identity USER_ID from role/access rules store 234. The RULES for the role are received in rules response RULES_RSP 312.

Access control module 230 determines whether the RULES permit access to the resource RESOURCE_ID. If the RULES do not allow access to the resource for the role assigned to the identity USER_ID, then a denial DENY is sent to access request module 224 at 320. Access request module 224 responds to the DENY by sending an error message at 322 to client 104.

If access to the resource is permitted under the RULES, then, at 332, access request module 224 forwards the access request to the resource 240 corresponding to the RESOURCE_ID from the access request 302. Resource 240 process the access request and returns a response RSP (USER_ID) at 334 to access request module 224, which returns the response to client 104 at 336.

Note that this is a generalized example for one possible RBAC model. Other variations can be implemented in other examples for a rule-based access control system.

The rules defined for a role in an RBAC approach to access control in a domain are generally defined by an administrator for the domain. Typically, each domain, e.g. tenant/cluster 122, has its own administrator who defines identity to role bindings as well as access control rules assigned to roles.

Configuring the identity to role bindings and the access rules for each role can become complicated and an administrator can misconfigure an identity to role binding that can result in more resources being accessible to an identity than are necessary, which can result in unnecessary risk exposure for the resources of a tenant/cluster 122.

Often, the same identities are used across different tenants, especially built-in identities that are used for cluster operation, or identities that are used by common applications. For example, for Kubernetes, in many cases, the same identities can be used across multiple tenants of a computing resource provider, e.g. a cloud computing system.

When a computing resource provider can access the identity/role binding data and role/access rule data from multiple tenants/clusters supported by the computing resource provider, then the disclosed technology can be utilized to extract information regarding the identity/role binding and access rules configured for roles from the multiple tenants/clusters. The extracted data can be used to create a prediction model to provide feedback to an administrator for configuring the rules for a role or, in some examples, automatic reconfiguration of the rules for a role.

Figure 4A:
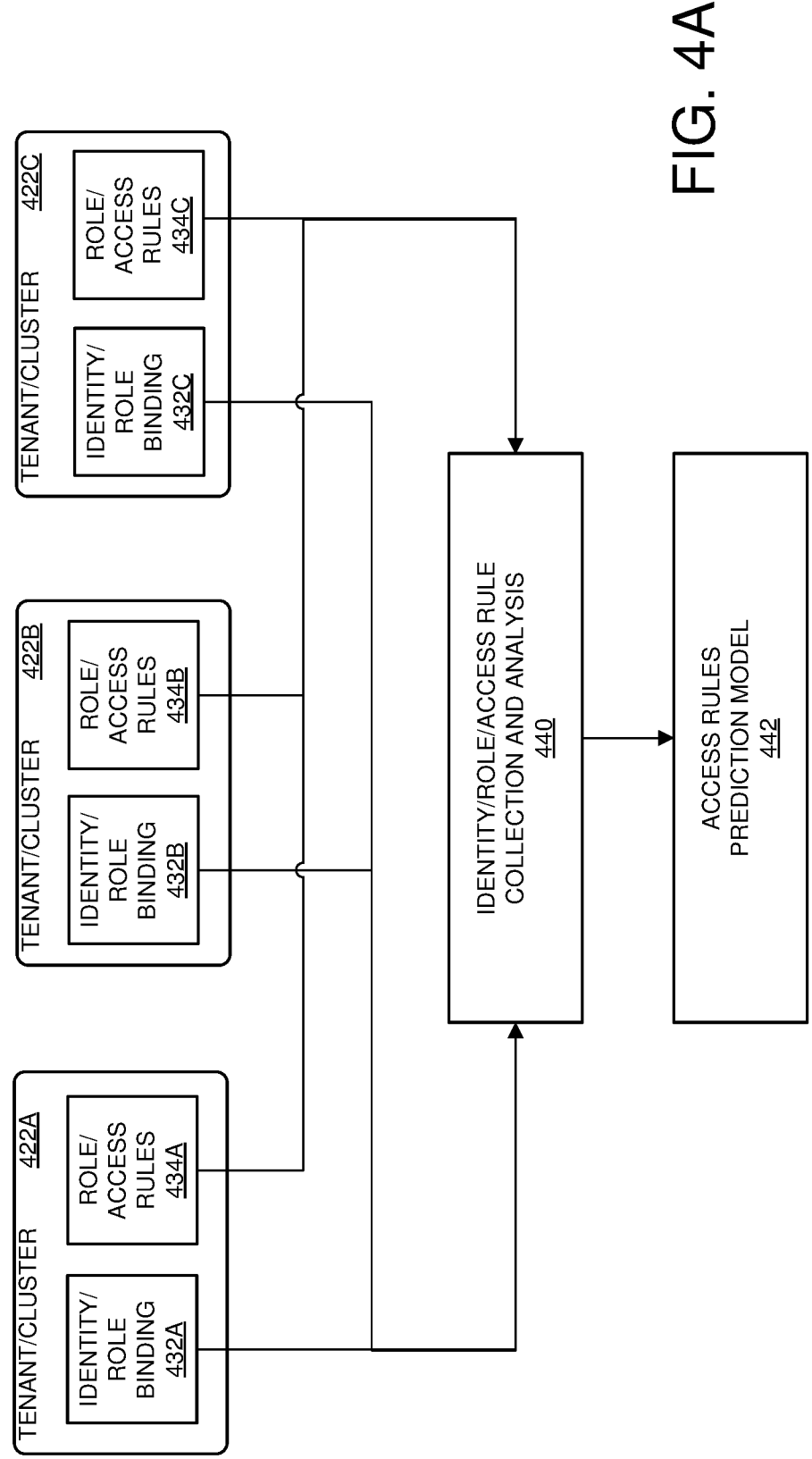
FIG. 4A is a software architecture diagram showing an illustrative example of an architecture for collection and analysis of identity/role binding data and role/access rules data from multiple tenant/clusters in a remote computing resource system in accordance with the disclosed technology.

FIG. 4A is a software architecture diagram showing an illustrative example of an architecture 400 for collection and analysis of identity/role binding data and role/access rules data from multiple tenant/clusters 422 in a remote computing resource system in accordance with the disclosed technology. In the architecture 400, identity/role/access rule collection and analysis module 440 collects identity/role bindings from the identity/role binding stores 432 of the tenant/clusters 422 as well as the access rules defined for roles from the role/access rules stores 434 in tenant/clusters 422. This data can be statically, periodically or dynamically collected.

Module 440 analyzes the identity/role binding data and role/access rule data collected from the tenant/clusters 422 and produces an access rules prediction model 442 that can predict the access rules for an identity based on the configuration data obtained from multiple tenants/clusters. Model 442 can be generated in a variety of ways that are consistent with the disclosed technology including a statistical model and a machine learning generated model.

Figure 4B:
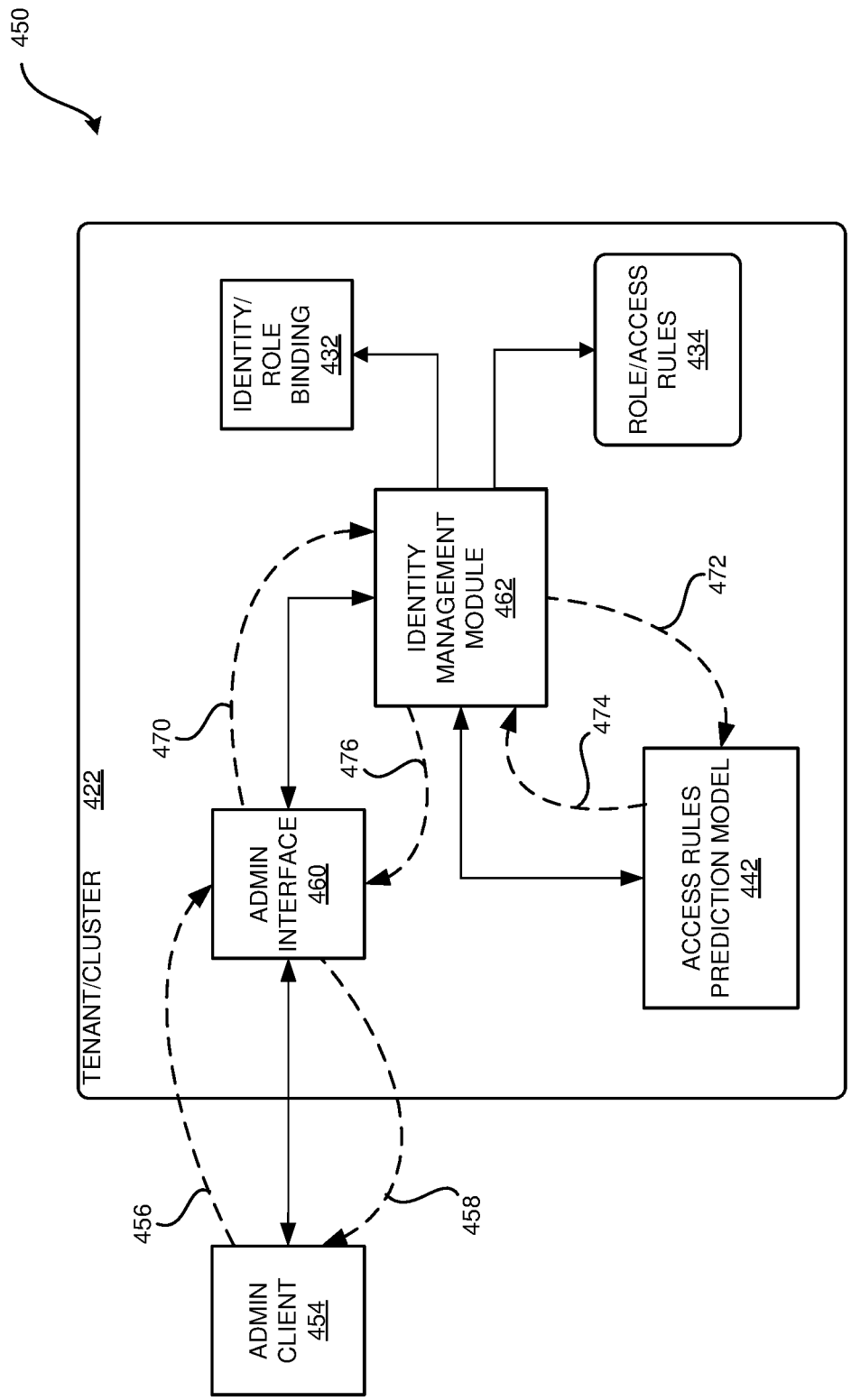
FIG. 4B is a software architecture diagram showing an illustrative example of identity management architecture that can detect misconfiguration of an identity in a RBAC system in a remote computing resource system in accordance with the disclosed technology.

The access rules prediction model 442 can be used to detect misconfiguration of the permissions for an identity during administrative configuration of identity/role bindings. FIG. 4B is a software architecture diagram showing an illustrative example of identity management architecture 450 that can detect misconfiguration of an identity in a RBAC system in a remote computing resource system in accordance with the disclosed technology.

In the example of FIG. 4B, an administrative client 454 interacts with an administrative interface 460 for a tenant/cluster 422, where interface 460 allows an administrator to define identity/role bindings and access rules for each role. At 456, administrative client 456 submits an identity to role binding definition that assigns a role to an identity.

Administrative interface 460 forwards the rule definition, at 470, to identity management module 462 for analysis. Role management module 462, at 472, requests a prediction of access rules for the identity from the access rules prediction model 442. Access rules prediction model 442 returns, at 474, a prediction of the access rules for the identity based on the identity/role binding data and role/access rule data collected from other tenants/clusters supported by the remote computing resource system.

Role management module 462 retrieves the access rules defined for the role assigned to the identity from role/access rule binding store 434 and compares the access rules defined for the role to the access rules predicted for the identity by model 442. If there is a discrepancy between the access rules obtained from role/access rule binding store 434 and the access rules predicted for the identity by model 442, then identity management module 462 can generate an identity misconfiguration alert, at 476, to administrative interface 460 that indicates an identity misconfiguration. For example, an access rule can be included or excluded from access rules predicted for the identity. The alert can be forwarded by administrative interface 460, at 458, to administrative client 454 for further action or for notification purposes.

In some examples, the alert can include a description of the included or excluded access rule for the identity. In other examples, a probability or statistical indication can be included that can indicate the frequency with which the included or excluded access rule is found or not found in the configuration data from other tenants/clusters. In still other examples, the identity misconfiguration alert can trigger an automatic reconfiguration of the identity/role binding or role/access rule binding to match the configuration data from other tenants/clusters.

Figure 5A:
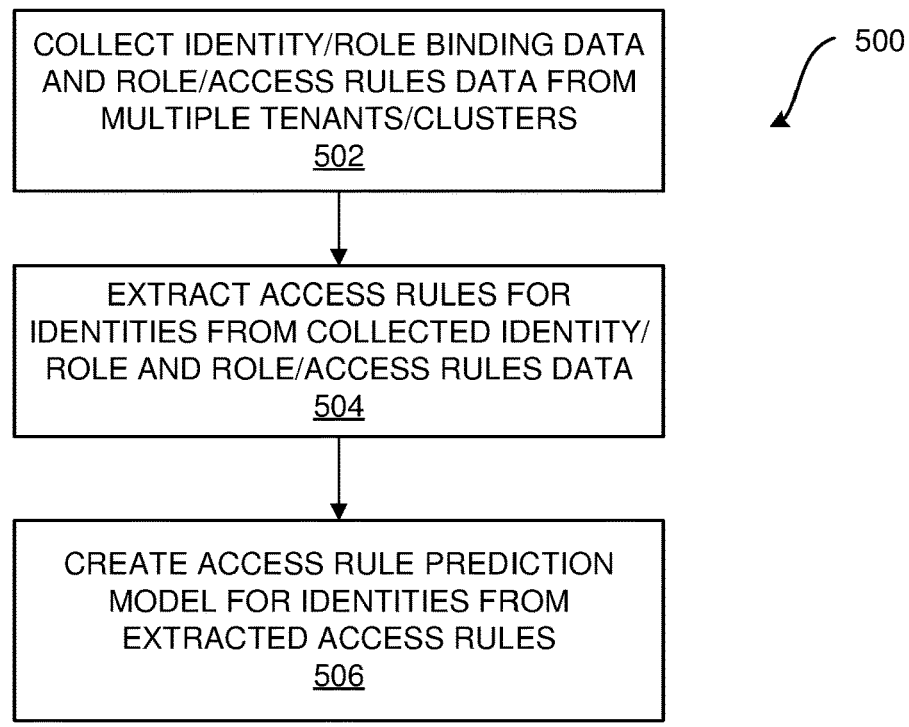
FIG. 5A is a control flow diagram showing an illustrative example of a process for creating an access rule prediction model from identity/role bindings and role/access rule data extracted from multiple tenants/clusters in a remote computing resource system in accordance with the disclosed technology.

FIG. 5A is a control flow diagram showing an illustrative example of a process 500 for creating an access rule prediction model from identity/role bindings and role/access rule data extracted from multiple tenants/clusters in a remote computing resource system in accordance with the disclosed technology.

In this example, at 502, identity/role binding data and role/rule binding data is collected from multiple tenants/clusters in a remote computing resource system. At 504, access rules for identities are extracted from the collected identity/role binding data and role/rule binding data is collected. At 506, an access rule prediction model for identities is created from the extracted access rules.

In one example, access rules configured for built-in identities used in Kubernetes implementations in different tenants/clusters can be extracted from the collected data and an access rule prediction model created to predict access rules for the identity in a new instantiation.

Figure 5B:
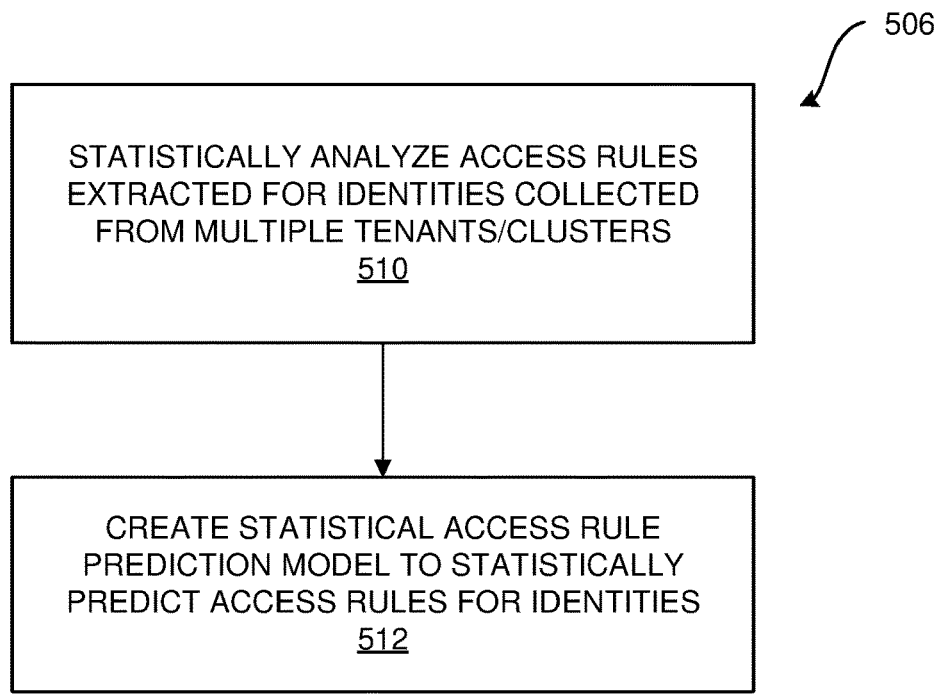
FIG. 5B is a control flow diagram showing one illustrative example of a process for creating a statistical rule prediction model from identity/role binding data and role/access rule data extracted from multiple tenants/clusters in accordance with the disclosed technology.

An access rule prediction model in accordance with the disclosed technology can be created in a variety of ways. FIG. 5B is a control flow diagram showing one illustrative example of a process, such as a process in collection and analysis module 440 of FIG. 4A, for creating a statistical rule prediction model in operation 506 of FIG. 5A from identity/role binding data and role/access rule data extracted from multiple tenants/clusters in accordance with the disclosed technology.

At 510, the access rules extracted from the identity/role binding data and role/access rule data can be statistically analyzed to determine likely access rules for identities. At 512, a statistical access rule prediction model is created to statistically predict access rules for an identity. For example, access rules that exceed a preselected or calculated statistical threshold can be identified as predicted access rules for an identity. As noted above, in some examples, some of the statistical data pertaining to the access rules can be provided to an administrative user.

Figure 5C:
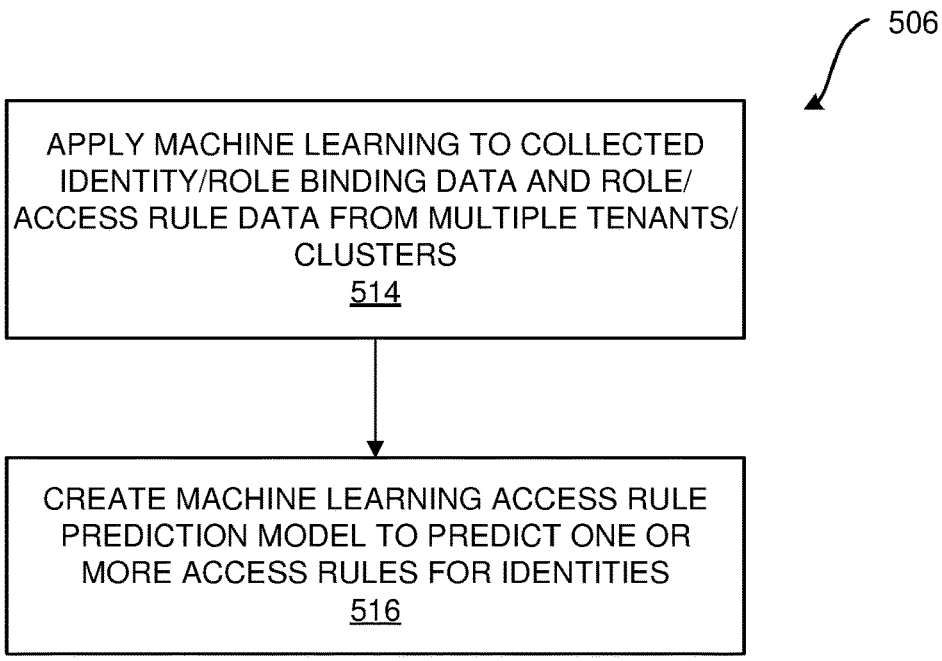
FIG. 5C is a flow diagram showing an illustrative example of a process for creating an access rule prediction model using machine learning techniques applied to identity/role binding data and role/access rule data extracted from multiple tenants/clusters in accordance with the disclosed technology.

Machine learning can also be utilized to create an access rule prediction model in accordance with certain examples of the disclosed technology. FIG. 5C is a flow diagram showing an illustrative example of a process, such as a process in collection and analysis module 440 of FIG. 4A, for creating an access rule prediction model in operation 506 of FIG. 5A using machine learning applied to identity/role binding data and role/access rule data extracted from multiple tenants/clusters in accordance with the disclosed technology.

In this example, at 514, machine learning techniques are applied to the identity/role bindings data and role/access rule data collected from multiple tenants/clusters. At 516, a machine learning rule prediction model is created using the machine learning techniques.

A variety of machine learning techniques, such as multi-layer networks, e.g. a full connected layer combined with a concatenation layer or a Bayesian network, can be utilized to create an access rule prediction model in accordance with the disclosed technology.

Figure 5D:
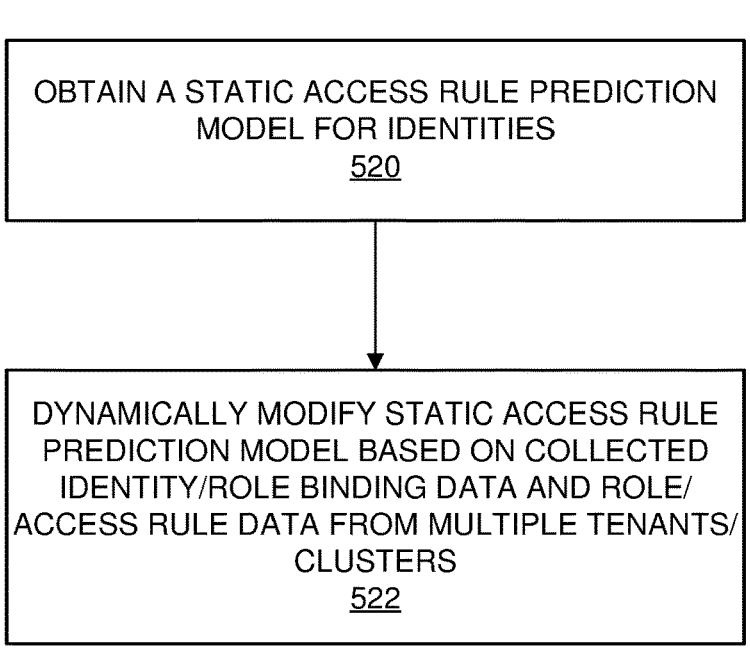
FIG. 5D is a control flow diagram showing an illustrative example of a process for modifying a static rule prediction model based on identity/role binding data and role/access rule data extracted from multiple tenants/clusters in accordance with the disclosed technology.

Another approach to creating an access rule prediction model in some examples can involve a static access rule prediction model that is modified using configuration data collected from the tenants/clusters residing on a remote computing resource platform. FIG. 5D is a control flow diagram showing an illustrative example of a process for operation 516 of FIG. 5C for modifying a static rule prediction model based on identity/role binding data and role/access rule data extracted from multiple tenants/clusters in accordance with the disclosed technology.

At 520, a static access rule prediction model for identities is obtained. For example, a manufacturer or an administrator for a remote computing resource platform can provide or select an initial static access rule prediction model as a starting point. At 522, the static access rule prediction model can be dynamically modified based on the identity/role binding data and role/access rule data from multiple tenants/clusters residing on the remote computing resource platform. In certain examples, the data from the tenants/clusters can be periodically collected and the access rule prediction model periodically modified to reflect changes in the collected data.

Figure 5E:
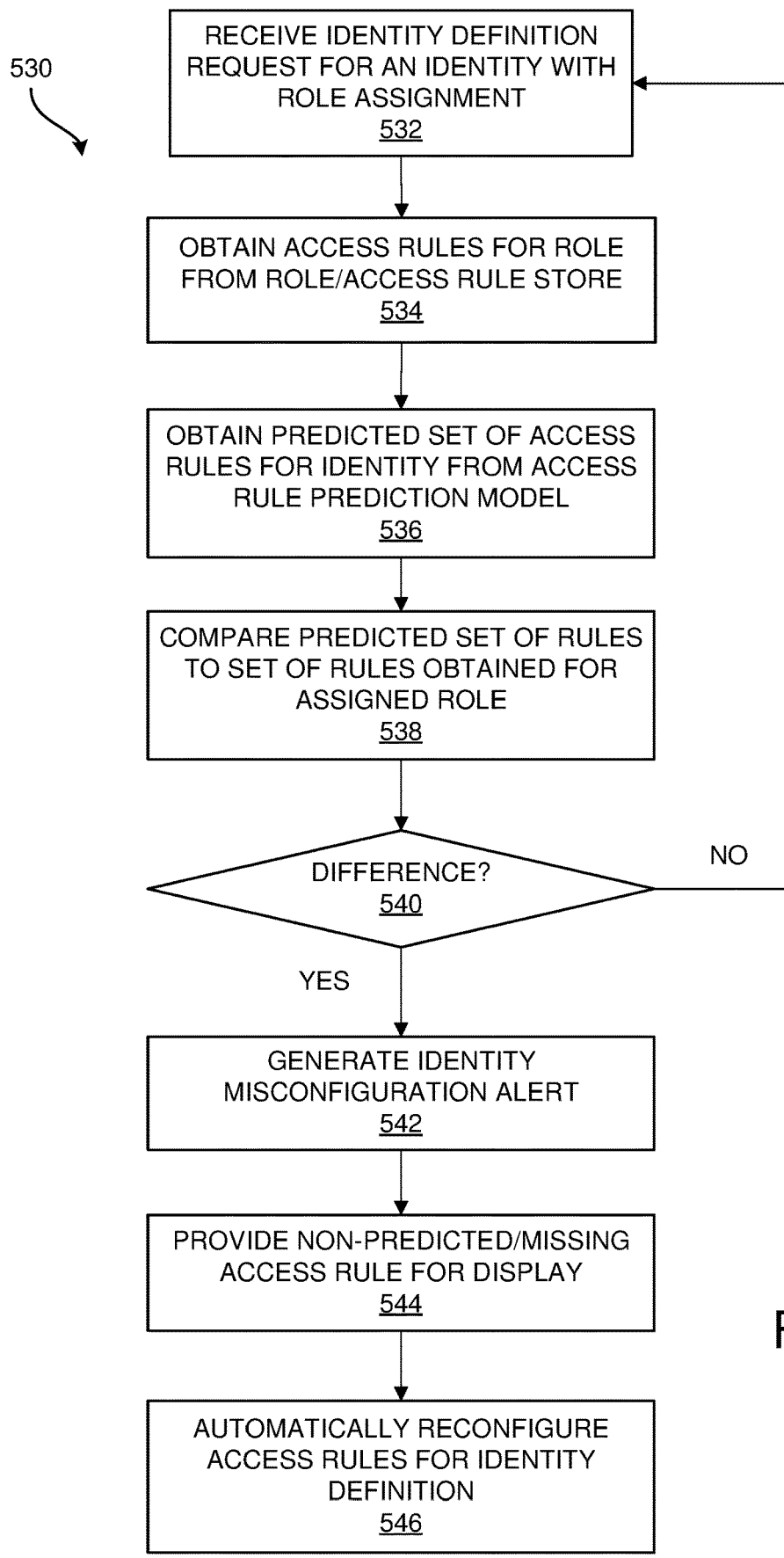
FIG. 5E is a control flow diagram showing an illustrative example of a process for detecting misconfiguration of an identity using an access rule prediction model in a remote computing resource system in accordance with the disclosed technology.

As described above with respect to the example of FIG. 4B, an identity management architecture can detect misconfiguration of an identity in a RBAC system in a remote computing resource system in accordance with the disclosed technology. FIG. 5E is a control flow diagram showing an illustrative example of a process 530, such as a process in identity management module 462, for detecting misconfiguration of an identity using an access rule prediction model in a remote computing resource system in accordance with the disclosed technology.

At 532, an identity definition with a role assignment for an identity is received, e.g. from administrative client 454 through administrative interface 460 for a tenant/cluster 422. At 534, the access rules for the assigned role in the identity definition is obtained. Note that access rules for the role may have been stored in a role/access rule store or defined in an interaction with an administrative client. At 536, a predicted set of access rules for the identity is obtained from an access rule prediction model based on identity/role binding data and role/rule data from multiple tenants/clusters residing on a remote computing resource platform.

At 538, the predicted set of access rules obtained for the identity is compared to the access rules obtained for the role assigned to the identity. If the predicted set of access rules and the access rules for the assigned role are different, then control branches at 540 to 542 to generate an identity misconfiguration alert.

At 544, in some examples, information about a non-predicted or missing rule, e.g. the difference identified at 538, can be provided for display, such as in a message to an administrative user that requested the identity/role binding.

In other examples, at 546, the role assigned to the identity or the access rules defined for the role can be automatically reconfigured so that there is no difference between the access rules predicted for the identity and the access rules defined for the role assigned to the identity.

One of skill in the art will readily appreciate that a variety of approaches may be utilized for detection of identity misconfiguration in a remote computing resource provider system without departing from the scope of the disclosed technology. The approach of the disclosed technology provides for the detection of identity misconfiguration in a tenant subscriber environment or a host remote computing services system.

It is to be appreciated that while the embodiments disclosed herein have been presented primarily in the context of a remote computing resources system. The technologies disclosed herein can be similarly applied to other contexts where similar functionality is utilized to provide computing resources that may be subject to compromise.

Figure 6:
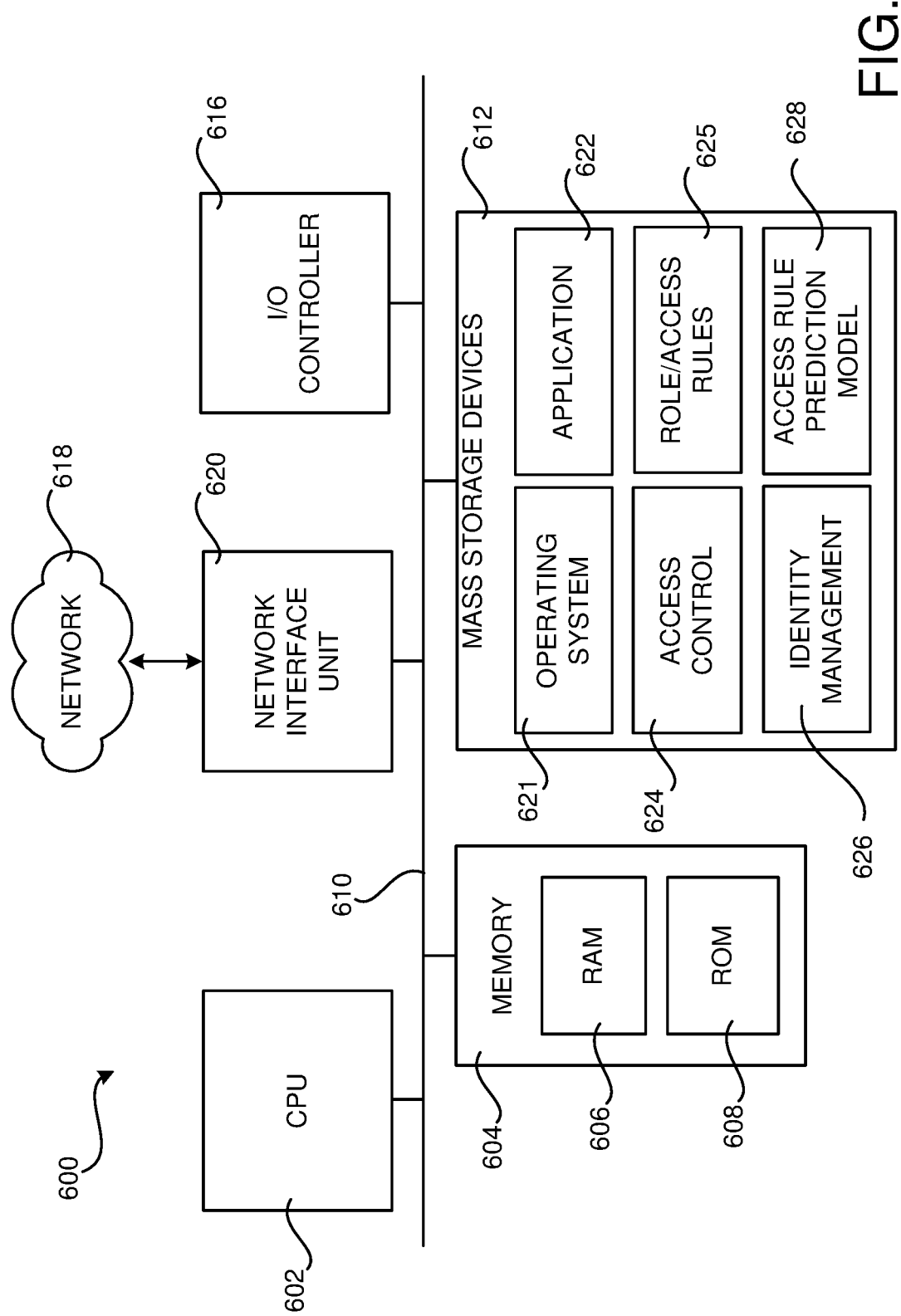
FIG. 6 is a computer architecture diagram showing an illustrative computer hardware and software architecture for a computing device, such as the computing devices shown in FIGS. 1-4 that can implement aspects of the technologies presented herein.

FIG. 6 is a computer architecture diagram that shows an architecture for a computer 600 capable of executing the software components described herein. The architecture illustrated in FIG. 6 is an architecture for a server computer, mobile phone, an e-reader, a smartphone, a desktop computer, a netbook computer, a tablet computer, a laptop computer, or another type of computing device suitable for executing the software components presented herein.

In this regard, it should be appreciated that the computer 600 shown in FIG. 6 can be utilized to implement a computing device capable of executing any of the software components presented herein. For example, and without limitation, the computing architecture described with reference to FIG. 6 can be utilized to implement the remote computing resources system 120 illustrated in FIG. 1, which is capable of executing the various software components described above, such as the modules of the architectures of FIGS. 4A-B or the operations of the processes illustrated in FIGS. 5A-E.

The computer 600 illustrated in FIG. 6 includes a central processing unit 602 ("CPU"), a system memory 604, including a random-access memory 606 ("RAM") and a read-only memory ("ROM") 608, and a system bus 610 that couples the memory 604 to the CPU 602. A basic input/output system ("BIOS" or "firmware") containing the basic routines that help to transfer information between elements within the computer 600, such as during startup, is stored in the ROM 608. The computer 600 further includes one or more mass storage devices 612 for storing an operating system 621, application programs 622, and other types of programs and data including, but not limited to, access control 624, role/access rules data 625, identity management 626, and access rule prediction model 628.

The mass storage device 612 is connected to the CPU 602 through a mass storage controller (not shown) connected to the bus 610. The mass storage device 612 and its associated computer readable media provide non-volatile storage for the computer 600. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer executable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 600. For purposes of the claims, the phrase "computer storage medium," and variations thereof, does not include waves or signals per se or communication media.

According to various configurations, the computer 600 can operate in a networked environment using logical connections to remote computers through a network such as the network 618. The computer 600 can connect to the network 618 through a network interface unit 620 connected to the bus 610. It should be appreciated that the network interface unit 620 can also be utilized to connect to other types of networks and remote computer systems. The computer 600 can also include an input/output controller 616 for receiving and processing input from a number of other devices, including a keyboard, mouse, touch input, or electronic stylus (not shown in FIG. 6). Similarly, the input/output controller 616 can provide output to a display screen or other type of output device (also not shown in FIG. 6).

It should be appreciated that the software components described herein, when loaded into the CPU 602 and executed, can transform the CPU 602 and the overall computer 600 from a general-purpose computing device into a special-purpose computing device customized to facilitate the functionality presented herein. The CPU 602 can be constructed from any number of transistors or other discrete circuit elements, which can individually or collectively assume any number of states. More specifically, the CPU 602 can operate as a finite-state machine, in response to executable instructions contained within the software modules disclosed herein. These computer executable instructions can transform the CPU 602 by specifying how the CPU 602 transitions between states, thereby transforming the transistors or other discrete hardware elements constituting the CPU 602.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 600 in order to store and execute the software components presented herein. It also should be appreciated that the architecture shown in FIG. 6 for the computer 600, or a similar architecture, can be utilized to implement other types of computing devices, including hand-held computers, video game devices, embedded computer systems, mobile devices such as smartphones and tablets, and other types of computing devices known to those skilled in the art. It is also contemplated that the computer 600 might not include all of the components shown in FIG. 6, can include other components that are not explicitly shown in FIG. 6, or can utilize an architecture completely different than that shown in FIG. 6.

Figure 7:
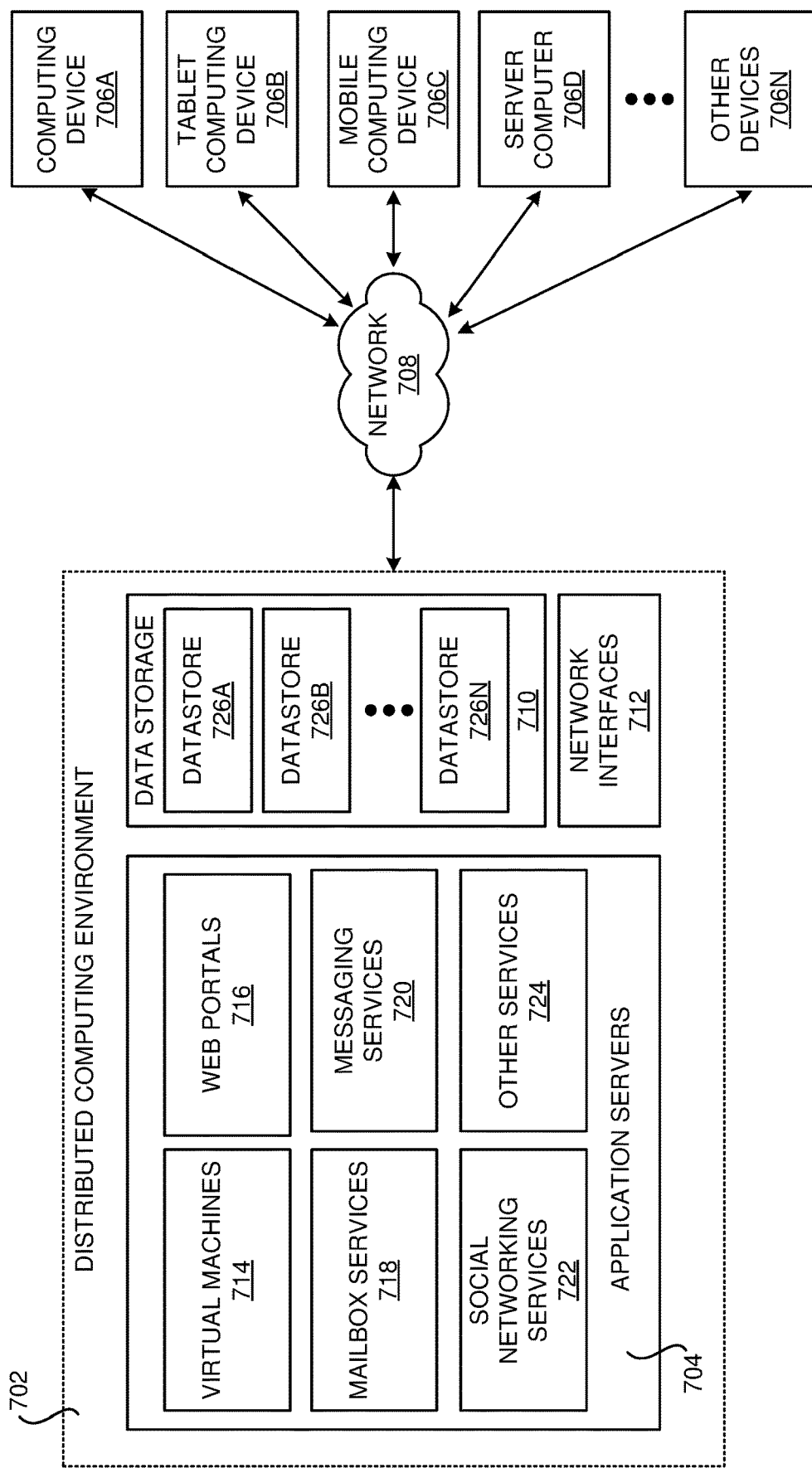
FIG. 7 is a network diagram illustrating a distributed computing environment capable of implementing aspects of the technologies presented herein.

FIG. 7 shows aspects of an illustrative distributed computing environment 702 that can provide cloud sourced resources, in which the software components described herein can be executed. Thus, the distributed computing environment 702 illustrated in FIG. 7 can be used to execute program code capable of providing the functionality described above with respect to FIGS. 1-5 and/or any of the other software components described herein.

According to various implementations, the distributed computing environment 702 operates on, in communication with, or as part of a network 708. One or more client devices 706A-706N (hereinafter referred to collectively and/or generically as "devices 706") can communicate with the distributed computing environment 702 via the network 708 and/or other connections (not illustrated in FIG. 7).

In the illustrated configuration, the devices 706 include: a computing device 706A such as a laptop computer, a desktop computer, or other computing device; a "slate" or tablet computing device ("tablet computing device") 706B; a mobile computing device 706C such as a mobile telephone, a smartphone, or other mobile computing device; a server computer 706D; and/or other devices 706N. It should be understood that any number of devices 706 can communicate with the distributed computing environment 702. Two example computing architectures for the devices 706 are illustrated and described herein with reference to FIGS. 6 and 8. It should be understood that the illustrated client devices 706 and computing architectures illustrated and described herein are illustrative and should not be construed as being limited in any way.

In the illustrated configuration, the distributed computing environment 702 includes application servers 704, data storage 710, and one or more network interfaces 712. According to various implementations, the functionality of the application servers 704 can be provided by one or more server computers that are executing as part of, or in communication with, the network 708. The application servers 704 can host various services such as virtual machines, portals, and/or other resources. In the illustrated configuration, the application servers 704 host one or more virtual machines 714 for hosting applications, such as program components for implementing the functionality described above with regard to FIGS. 1-5. It should be understood that this configuration is illustrative and should not be construed as being limiting in any way. The application servers 704 might also host or provide access to one or more web portals, link pages, websites, and/or other information ("web portals") 716.

According to various implementations, the application servers 704 also include one or more mailbox services 718 and one or more messaging services 720. The mailbox services 718 can include electronic mail ("email") services. The mailbox services 718 can also include various personal information management ("PIM") services including, but not limited to, calendar services, contact management services, collaboration services, and/or other services. The messaging services 720 can include, but are not limited to, instant messaging ("IM") services, chat services, forum services, and/or other communication services.

The application servers 704 can also include one or more social networking services 722. The social networking services 722 can provide various types of social networking services including, but not limited to, services for sharing or posting status updates, instant messages, links, photos, videos, and/or other information, services for commenting or displaying interest in articles, products, blogs, or other resources, and/or other services. In some configurations, the social networking services 722 are provided by or include the FACEBOOK social networking service, the LINKEDIN professional networking service, the FOURSQUARE geographic networking service, and the like. In other configurations, the social networking services 722 are provided by other services, sites, and/or providers that might be referred to as "social networking providers." For example, some websites allow users to interact with one another via email, chat services, and/or other means during various activities and/or contexts such as reading published articles, commenting on goods or services, publishing, collaboration, gaming, and the like. Other services are possible and are contemplated.

The social network services 722 can include commenting, blogging, and/or microblogging services. Examples of such services include, but are not limited to, the YELP commenting service, the KUDZU review service, the OFFICETALK enterprise microblogging service, the TWITTER messaging service, and/or other services. It should be appreciated that the above lists of services are not exhaustive and that numerous additional and/or alternative social networking services 722 are not mentioned herein for the sake of brevity. As such, the configurations described above are illustrative, and should not be construed as being limited in any way.

As also shown in FIG. 7, the application servers 704 can also host other services, applications, portals, and/or other resources ("other services") 724. These services can include, but are not limited to, streaming video services like the NETFLIX streaming video service and productivity services such as the GMAIL email service from GOOGLE INC. It thus can be appreciated that activities performed by users of the distributed computing environment 702 can include various mailbox, messaging, social networking, group conversation, productivity, entertainment, and other types of activities. Use of these services, and others, can be detected and used to customize the operation of a computing device utilizing the technologies disclosed herein.

As mentioned above, the distributed computing environment 702 can include data storage 710. According to various implementations, the functionality of the data storage 710 is provided by one or more databases operating on, or in communication with, the network 708. The functionality of the data storage 710 can also be provided by one or more server computers configured to host data for the distributed computing environment 702. The data storage 710 can include, host, or provide one or more real or virtual datastores 726A-726N (hereinafter referred to collectively and/or generically as "datastores 726"). The datastores 726 are configured to host data used or created by the application servers 704 and/or other data.

The distributed computing environment 702 can communicate with, or be accessed by, the network interfaces 712. The network interfaces 712 can include various types of network hardware and software for supporting communications between two or more computing devices including, but not limited to, the devices 706 and the application servers 704. It should be appreciated that the network interfaces 712 can also be utilized to connect to other types of networks and/or computer systems.

It should be understood that the distributed computing environment 702 described herein can implement any aspects of the software elements described herein with any number of virtual computing resources and/or other distributed computing functionality that can be configured to execute any aspects of the software components disclosed herein. It should also be understood that the devices 706 can also include real or virtual machines including, but not limited to, server computers, web servers, personal computers, gaming consoles or other types of gaming devices, mobile computing devices, smartphones, and/or other devices. As such, various implementations of the technologies disclosed herein enable any device configured to access the distributed computing environment 702 to utilize the functionality described herein.

Figure 8:
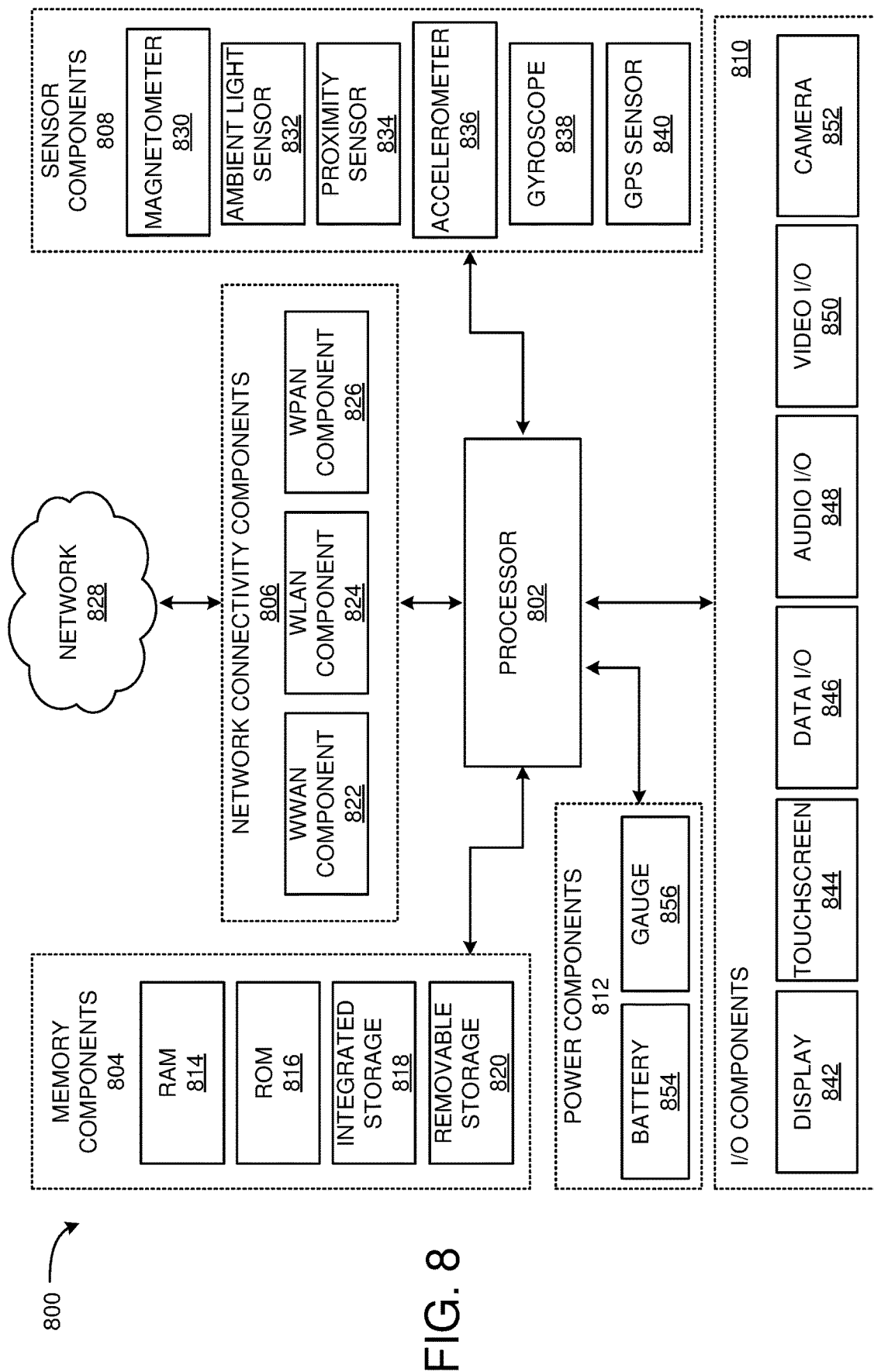
FIG. 8 is a computer architecture diagram illustrating a computing device architecture for a computing device, such as the computing devices shown in FIGS. 1-4, that is capable of implementing aspects of the technologies presented herein.

Turning now to FIG. 8, an illustrative computing device architecture 800 will be described for a computing device, such as the computing devices 104 and remote computing resource provider system 120 illustrated in FIG. 1, that is capable of executing the various software components described herein. The computing device architecture 800 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like.

The computing device architecture 800 is also applicable to any of the devices 706 shown in FIG. 7. Furthermore, aspects of the computing device architecture 800 are applicable to traditional desktop computers, portable computers (e.g., laptops, notebooks, ultra-portables, and netbooks), server computers, and other computer devices, such as those described herein. For example, the single touch and multi-touch aspects disclosed herein below can be applied to desktop, laptop, convertible, smartphone, or tablet computer devices that utilize a touchscreen or some other touch-enabled device, such as a touch-enabled track pad or touch-enabled mouse. The computing device architecture 800 can also be utilized to implement the remote computer resources system of FIG. 1 and/or other types of computing devices for implementing or consuming the functionality described herein.

The computing device architecture 800 illustrated in FIG. 8 includes a processor 802, memory components 804, network connectivity components 806, sensor components 808, input/output components 810, and power components 812. In the illustrated configuration, the processor 802 is in communication with the memory components 804, the network connectivity components 806, the sensor components 808, the input/output ("I/O") components 810, and the power components 812. Although no connections are shown between the individual components illustrated in FIG. 8, the components can be connected electrically in order to interact and carry out device functions. In some configurations, the components are arranged so as to communicate via one or more busses (not shown).

The processor 802 includes one or more CPU cores configured to process data, execute computer executable instructions of one or more application programs and to communicate with other components of the computing device architecture 800 in order to perform various functionality described herein. The processor 802 can be utilized to execute aspects of the software components presented herein and, particularly, those that utilize, at least in part, a touch-enabled input.

In some configurations, the processor 802 includes a graphics processing unit ("GPU") configured to accelerate operations performed by the CPU, including, but not limited to, operations performed by executing general-purpose scientific and engineering computing applications, as well as graphics-intensive computing applications such as high-resolution video (e.g., 720P, 1080P, 4K, and greater), video games, 3D modeling applications, and the like. In some configurations, the processor 802 is configured to communicate with a discrete GPU (not shown). In any case, the CPU and GPU can be configured in accordance with a co-processing CPU/GPU computing model, wherein the sequential part of an application executes on the CPU and the computationally intensive part is accelerated by the GPU.

In some configurations, the processor 802 is, or is included in, a system-on-chip ("SoC") along with one or more of the other components described herein below. For example, the SoC can include the processor 802, a GPU, one or more of the network connectivity components 806, and one or more of the sensor components 808. In some configurations, the processor 802 is fabricated, in part, utilizing a package-on-package ("PoP") integrated circuit packaging technique. Moreover, the processor 802 can be a single core or multi-core processor.

The processor 802 can be created in accordance with an ARM architecture, available for license from ARM HOLDINGS of Cambridge, United Kingdom. Alternatively, the processor 802 can be created in accordance with an x86 architecture, such as is available from INTEL CORPORATION of Mountain View, California and others. In some configurations, the processor 802 is a SNAPDRAGON SoC, available from QUALCOMM of San Diego, California, a TEGRA SoC, available from NVIDIA of Santa Clara, California, a HUMMINGBIRD SoC, available from SAMSUNG of Seoul, South Korea, an Open Multimedia Application Platform ("OMAP") SoC, available from TEXAS INSTRUMENTS of Dallas, Texas, a customized version of any of the above SoCs, or a proprietary SoC.

The memory components 804 include a RAM 814, a ROM 816, an integrated storage memory ("integrated storage") 818, and a removable storage memory ("removable storage") 820. In some configurations, the RAM 814 or a portion thereof, the ROM 816 or a portion thereof, and/or some combination of the RAM 814 and the ROM 816 is integrated in the processor 802. In some configurations, the ROM 816 is configured to store a firmware, an operating system or a portion thereof (e.g., operating system kernel), and/or a bootloader to load an operating system kernel from the integrated storage 818 or the removable storage 820.

The integrated storage 818 can include a solid-state memory, a hard disk, or a combination of solid-state memory and a hard disk. The integrated storage 818 can be soldered or otherwise connected to a logic board upon which the processor 802 and other components described herein might also be connected. As such, the integrated storage 818 is integrated in the computing device. The integrated storage 818 can be configured to store an operating system or portions thereof, application programs, data, and other software components described herein.

The removable storage 820 can include a solid-state memory, a hard disk, or a combination of solid-state memory and a hard disk. In some configurations, the removable storage 820 is provided in lieu of the integrated storage 818. In other configurations, the removable storage 820 is provided as additional optional storage. In some configurations, the removable storage 820 is logically combined with the integrated storage 818 such that the total available storage is made available and shown to a user as a total combined capacity of the integrated storage 818 and the removable storage 820.

The removable storage 820 is configured to be inserted into a removable storage memory slot (not shown) or other mechanism by which the removable storage 820 is inserted and secured to facilitate a connection over which the removable storage 820 can communicate with other components of the computing device, such as the processor 802. The removable storage 820 can be embodied in various memory card formats including, but not limited to, PC card, COMPACTFLASH card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 804 can store an operating system. According to various configurations, the operating system includes, but is not limited to, the WINDOWS operating system from MICROSOFT CORPORATION, the IOS operating system from APPLE INC. of Cupertino, California, and ANDROID operating system from GOOGLE INC. of Mountain View, California Other operating systems can also be utilized.

The network connectivity components 806 include a wireless wide area network component ("WWAN component") 822, a wireless local area network component ("WLAN component") 824, and a wireless personal area network component ("WPAN component") 826. The network connectivity components 806 facilitate communications to and from a network 828, which can be a WWAN, a WLAN, or a WPAN. Although a single network 828 is illustrated, the network connectivity components 806 can facilitate simultaneous communication with multiple networks. For example, the network connectivity components 806 can facilitate simultaneous communications with multiple networks via one or more of a WWAN, a WLAN, or a WPAN.

The network 828 can be a WWAN, such as a mobile telecommunications network utilizing one or more mobile telecommunications technologies to provide voice and/or data services to a computing device utilizing the computing device architecture 800 via the WWAN component 822. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX").

Moreover, the network 828 can utilize various channel access methods (which might or might not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications can be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 828 can be configured to provide voice and/or data communications with any combination of the above technologies. The network 828 can be configured or adapted to provide voice and/or data communications in accordance with future generation technologies.

In some configurations, the WWAN component 822 is configured to provide dual-multi-mode connectivity to the network 828. For example, the WWAN component 822 can be configured to provide connectivity to the network 828, wherein the network 828 provides service via GSM and UMTS technologies, or via some other combination of technologies. Alternatively, multiple WWAN components 822 can be utilized to perform such functionality, and/or provide additional functionality to support other non-compatible technologies (i.e., incapable of being supported by a single WWAN component). The WWAN component 822 can facilitate similar connectivity to multiple networks (e.g., a UMTS network and an LTE network).

The network 828 can be a WLAN operating in accordance with one or more Institute of Electrical and Electronic Engineers ("IEEE") 104.11 standards, such as IEEE 104.11a, 104.11b, 104.11g, 104.11n, and/or a future 104.11 standard (referred to herein collectively as WI-FI). Draft 104.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 824 is configured to connect to the network 828 via the WI-FI access points. Such connections can be secured via various encryption technologies including, but not limited, WI-FI Protected Access ("WPA"), WPA2, Wired Equivalent Privacy ("WEP"), and the like.

The network 828 can be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 826 is configured to facilitate communications with other devices, such as peripherals, computers, or other computing devices via the WPAN.

The sensor components 808 include a magnetometer 830, an ambient light sensor 832, a proximity sensor 834, an accelerometer 836, a gyroscope 838, and a Global Positioning System sensor ("GPS sensor") 840. It is contemplated that other sensors, such as, but not limited to, temperature sensors or shock detection sensors, might also be incorporated in the computing device architecture 800.

The magnetometer 830 is configured to measure the strength and direction of a magnetic field. In some configurations, the magnetometer 830 provides measurements to a compass application program stored within one of the memory components 804 in order to provide a user with accurate directions in a frame of reference including the cardinal directions, north, south, east, and west. Similar measurements can be provided to a navigation application program that includes a compass component. Other uses of measurements obtained by the magnetometer 830 are contemplated.

The ambient light sensor 832 is configured to measure ambient light. In some configurations, the ambient light sensor 832 provides measurements to an application program stored within one the memory components 804 in order to automatically adjust the brightness of a display (described below) to compensate for low light and bright light environments. Other uses of measurements obtained by the ambient light sensor 832 are contemplated.

The proximity sensor 834 is configured to detect the presence of an object or thing in proximity to the computing device without direct contact. In some configurations, the proximity sensor 834 detects the presence of a user's body (e.g., the user's face) and provides this information to an application program stored within one of the memory components 804 that utilizes the proximity information to enable or disable some functionality of the computing device. For example, a telephone application program can automatically disable a touchscreen (described below) in response to receiving the proximity information so that the user's face does not inadvertently end a call or enable/disable other functionality within the telephone application program during the call. Other uses of proximity as detected by the proximity sensor 834 are contemplated.

The accelerometer 836 is configured to measure proper acceleration. In some configurations, output from the accelerometer 836 is used by an application program as an input mechanism to control some functionality of the application program. In some configurations, output from the accelerometer 836 is provided to an application program for use in switching between landscape and portrait modes, calculating coordinate acceleration, or detecting a fall. Other uses of the accelerometer 836 are contemplated.

The gyroscope 838 is configured to measure and maintain orientation. In some configurations, output from the gyroscope 838 is used by an application program as an input mechanism to control some functionality of the application program. For example, the gyroscope 838 can be used for accurate recognition of movement within a 3D environment of a video game application or some other application. In some configurations, an application program utilizes output from the gyroscope 838 and the accelerometer 836 to enhance user input operations. Other uses of the gyroscope 838 are contemplated.

The GPS sensor 840 is configured to receive signals from GPS satellites for use in calculating a location. The location calculated by the GPS sensor 840 can be used by any application program that requires or benefits from location information. For example, the location calculated by the GPS sensor 840 can be used with a navigation application program to provide directions from the location to a destination or directions from the destination to the location. Moreover, the GPS sensor 840 can be used to provide location information to an external location-based service, such as E911 service. The GPS sensor 840 can obtain location information generated via WI-FI, WIMAX, and/or cellular triangulation techniques utilizing one or more of the network connectivity components 806 to aid the GPS sensor 840 in obtaining a location fix. The GPS sensor 840 can also be used in Assisted GPS ("A-GPS") systems.

The I/O components 810 include a display 842, a touchscreen 844, a data I/O interface component ("data I/O") 846, an audio I/O interface component ("audio I/O") 848, a video I/O interface component ("video I/O") 850, and a camera 852. In some configurations, the display 842 and the touchscreen 844 are combined. In some configurations two or more of the data I/O component 846, the audio I/O component 848, and the video I/O component 850 are combined. The I/O components 810 can include discrete processors configured to support the various interfaces described below or might include processing functionality built-in to the processor 802.

The display 842 is an output device configured to present information in a visual form. In particular, the display 842 can present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 842 is a liquid crystal display ("LCD") utilizing any active or passive matrix technology and any backlighting technology (if used). In some configurations, the display 842 is an organic light emitting diode ("OLED") display. Other display types are contemplated.

The touchscreen 844 is an input device configured to detect the presence and location of a touch. The touchscreen 844 can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some configurations, the touchscreen 844 is incorporated on top of the display 842 as a transparent layer to enable a user to use one or more touches to interact with objects or other information presented on the display 842. In other configurations, the touchscreen 844 is a touch pad incorporated on a surface of the computing device that does not include the display 842. For example, the computing device can have a touchscreen incorporated on top of the display 842 and a touch pad on a surface opposite the display 842.

In some configurations, the touchscreen 844 is a single-touch touchscreen. In other configurations, the touchscreen 844 is a multi-touch touchscreen. In some configurations, the touchscreen 844 is configured to detect discrete touches, single touch gestures, and/or multi-touch gestures. These are collectively referred to herein as "gestures" for convenience. Several gestures will now be described. It should be understood that these gestures are illustrative and are not intended to limit the scope of the appended claims. Moreover, the described gestures, additional gestures, and/or alternative gestures can be implemented in software for use with the touchscreen 844. As such, a developer can create gestures that are specific to a particular application program.

In some configurations, the touchscreen 844 supports a tap gesture in which a user taps the touchscreen 844 once on an item presented on the display 842. The tap gesture can be used for various reasons including, but not limited to, opening or launching whatever the user taps, such as a graphical icon. In some configurations, the touchscreen 844 supports a double tap gesture in which a user taps the touchscreen 844 twice on an item presented on the display 842. The double tap gesture can be used for various reasons including, but not limited to, zooming in or zooming out in stages. In some configurations, the touchscreen 844 supports a tap and hold gesture in which a user taps the touchscreen 844 and maintains contact for at least a pre-defined time. The tap and hold gesture can be used for various reasons including, but not limited to, opening a context-specific menu.

In some configurations, the touchscreen 844 supports a pan gesture in which a user places a finger on the touchscreen 844 and maintains contact with the touchscreen 844 while moving the finger on the touchscreen 844. The pan gesture can be used for various reasons including, but not limited to, moving through screens, images, or menus at a controlled rate. Multiple finger pan gestures are also contemplated. In some configurations, the touchscreen 844 supports a flick gesture in which a user swipes a finger in the direction the user wants the screen to move. The flick gesture can be used for various reasons including, but not limited to, scrolling horizontally or vertically through menus or pages. In some configurations, the touchscreen 844 supports a pinch and stretch gesture in which a user makes a pinching motion with two fingers (e.g., thumb and forefinger) on the touchscreen 844 or moves the two fingers apart. The pinch and stretch gesture can be used for various reasons including, but not limited to, zooming gradually in or out of a website, map, or picture.

Although the gestures described above have been presented with reference to the use of one or more fingers for performing the gestures, other appendages such as toes or objects such as styluses can be used to interact with the touchscreen 844. As such, the above gestures should be understood as being illustrative and should not be construed as being limiting in any way.

The data I/O interface component 846 is configured to facilitate input of data to the computing device and output of data from the computing device. In some configurations, the data I/O interface component 846 includes a connector configured to provide wired connectivity between the computing device and a computer system, for example, for synchronization operation purposes. The connector can be a proprietary connector or a standardized connector such as USB, micro-USB, mini-USB, USB-C, or the like. In some configurations, the connector is a dock connector for docking the computing device with another device such as a docking station, audio device (e.g., a digital music player), or video device.

The audio I/O interface component 848 is configured to provide audio input and/or output capabilities to the computing device. In some configurations, the audio I/O interface component 848 includes a microphone configured to collect audio signals. In some configurations, the audio I/O interface component 848 includes a headphone jack configured to provide connectivity for headphones or other external speakers. In some configurations, the audio interface component 848 includes a speaker for the output of audio signals. In some configurations, the audio I/O interface component 848 includes an optical audio cable out.

The video I/O interface component 850 is configured to provide video input and/or output capabilities to the computing device. In some configurations, the video I/O interface component 850 includes a video connector configured to receive video as input from another device (e.g., a video media player such as a DVD or BLU-RAY player) or send video as output to another device (e.g., a monitor, a television, or some other external display). In some configurations, the video I/O interface component 850 includes a High-Definition Multimedia Interface ("HDMI"), mini-HDMI, micro-HDMI, DisplayPort, or proprietary connector to input/output video content. In some configurations, the video I/O interface component 850 or portions thereof is combined with the audio I/O interface component 848 or portions thereof.

The camera 852 can be configured to capture still images and/or video. The camera 852 can utilize a charge coupled device ("CCD") or a complementary metal oxide semiconductor ("CMOS") image sensor to capture images. In some configurations, the camera 852 includes a flash to aid in taking pictures in low-light environments. Settings for the camera 852 can be implemented as hardware or software buttons.

Although not illustrated, one or more hardware buttons can also be included in the computing device architecture 800. The hardware buttons can be used for controlling some operational aspect of the computing device. The hardware buttons can be dedicated buttons or multi-use buttons. The hardware buttons can be mechanical or sensor-based.

The illustrated power components 812 include one or more batteries 854, which can be connected to a battery gauge 856. The batteries 854 can be rechargeable or disposable. Rechargeable battery types include, but are not limited to, lithium polymer, lithium ion, nickel cadmium, and nickel metal hydride. Each of the batteries 854 can be made of one or more cells.

The battery gauge 856 can be configured to measure battery parameters such as current, voltage, and temperature. In some configurations, the battery gauge 856 is configured to measure the effect of a battery's discharge rate, temperature, age and other factors to predict remaining life within a certain percentage of error. In some configurations, the battery gauge 856 provides measurements to an application program that is configured to utilize the measurements to present useful power management data to a user. Power management data can include one or more of a percentage of battery used, a percentage of battery remaining, a battery condition, a remaining time, a remaining capacity (e.g., in watt hours), a current draw, and a voltage.

The power components 812 can also include a power connector (not shown), which can be combined with one or more of the aforementioned I/O components 810. The power components 812 can interface with an external power system or charging equipment via a power I/O component 810. Other configurations can also be utilized.

Based on the foregoing, it should be appreciated that the disclosed technology provides for the detection of identity misconfiguration in a remote computing resource provider system.

Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method for detection of identity misconfiguration in a remote computing resource provider system, the method comprising:
collecting identity to role binding data and role to access rules data from multiple clusters supported by the remote computing resource provider system;
for each of one or more identities in the collected identity to role binding data, extracting a set of access rules for each identity from the identity to role binding data and role to access rules data collected from the multiple clusters;
creating an access rule prediction model from the sets of access rules extracted for the one or more identities from the identity to role binding data and role to access rules data collected from the multiple clusters to predict access rules for identities;
receiving an identity definition request for a tenant, the identity definition request having a requested identity and a requested role assigned to the identity;
obtaining a set of access rules for the role assigned to the identity;
obtaining a predicted set of access rules for the requested identity from the access rule prediction model;

comparing the set of access rules for the requested role to the predicted set of access rules for the requested identity;
determining that there is a difference between the set of access rules for the requested role and the predicted set of access rules for the requested identity;
based on determining that there is the difference between the set of access rules for the requested role and the predicted set of access rules for the requested identity, generating an identity misconfiguration alert that identifies the difference between the set of access rules for the requested role and the predicted set of access rules for the requested identity; and
based on generating the identity misconfiguration alert, reconfiguring the requested identity using the predicted set of access rules for the requested identity.

2. The computer-implemented method of claim 1, where the step of creating an access rule prediction model from the sets of access rules extracted for the one or more identities from the identity to role binding data and role to access rules data collected from the multiple clusters to predict access rules for identities comprises:
statistically analyzing the sets of access rules extracted for the one or more identities from the identity to role binding data and role to access rules data collected from the multiple clusters to create a statistical access rule prediction model to statistically predict access rules for identities.

3. The computer-implemented method of claim 1, where the step of creating an access rule prediction model from the sets of access rules extracted for the one or more identities from the identity to role binding data and role to access rules data collected from the multiple clusters to predict access rules for identities comprises:
applying machine learning to the sets of access rules extracted for the one or more identities from the identity to role binding data and role to access rules data collected from the multiple clusters to create a machine learning access rule prediction model to predict access rules for identities.

4. The computer-implemented method of claim 3, where the step of applying machine learning to the sets of access rules extracted for the one or more identities from the identity to role binding data and role to access rules data collected from the multiple clusters to create a machine learning access rule prediction model to predict access rules for identities comprises:
obtaining a static access rule prediction model for identities; and
dynamically modifying the static access rule prediction model based on the sets of access rules extracted for the one or more identities from the identity to role binding data and role to access rules data collected from the multiple clusters.

5. The computer-implemented method of claim 1, where the step of generating an identity misconfiguration alert when there is a difference between the set of access rules for the requested role to the predicted set of access rules for the requested identity includes:
automatically reconfiguring the access rules for the requested identity.

6. The computer-implemented method of claim 1, where the step of generating an identity misconfiguration alert when there is a difference between the set of access rules for the requested role to the predicted set of access rules for the requested identity comprises:
providing a message for display that indicates that the access rules for the requested identity may be misconfigured.

7. The computer-implemented method of claim 6, where the message provided for display indicates the difference between the set of access rules for the requested role and the predicted set of access rules for the requested identity.

8. One or more computer storage media having computer executable instructions stored thereon which, when executed by hardware one or more processors, cause the processors to execute a method for detection of identity misconfiguration in a remote computing resource provider system, the method comprising:
collecting identity to role binding data and role to access rules data from multiple clusters supported by the remote computing resource provider system;
for each of one or more identities in the collected identity to role binding data, extracting a set of access rules for each identity from the identity to role binding data and role to access rules data collected from the multiple clusters;
creating an access rule prediction model from the sets of access rules extracted for the one or more identities from the identity to role binding data and role to access rules data collected from the multiple clusters to predict access rules for identities;
receiving an identity definition request for a tenant, the identity definition request having a requested identity and a requested role assigned to the identity;
obtaining a set of access rules for the role assigned to the identity;
obtaining a predicted set of access rules for the requested identity from the access rule prediction model;
comparing the set of access rules for the requested role to the predicted set of access rules for the requested identity;
determining that there is a difference between the set of access rules for the requested role and the predicted set of access rules for the requested identity;
based on determining that there is the difference between the set of access rules for the requested role and the predicted set of access rules for the requested identity, generating an identity misconfiguration alert that identifies the difference between the set of access rules for the requested role and the predicted set of access rules for the requested identity; and
based on generating the identity misconfiguration alert, reconfiguring the requested identity using the predicted set of access rules for the requested identity.

9. The one or more computer storage media of claim 8, where the step of creating an access rule prediction model from the sets of access rules extracted for the one or more identities from the identity to role binding data and role to access rules data collected from the multiple clusters to predict access rules for identities comprises:
statistically analyzing the sets of access rules extracted for the one or more identities from the identity to role binding data and role to access rules data collected from the multiple clusters to create a statistical access rule prediction model to statistically predict access rules for identities.

10. The one or more computer storage media of claim 8, where the step of creating an access rule prediction model from the sets of access rules extracted for the one or more identities from the identity to role binding data and role to access rules data collected from the multiple clusters to predict access rules for identities comprises:

applying machine learning to the sets of access rules extracted for the one or more identities from the identity to role binding data and role to access rules data collected from the multiple clusters to create a machine learning access rule prediction model to predict access rules for identities.

11. The one or more computer storage media of claim 10, where the step of applying machine learning to the sets of access rules extracted for the one or more identities from the identity to role binding data and role to access rules data collected from the multiple clusters to create a machine learning access rule prediction model to predict access rules for identities comprises:
 obtaining a static access rule prediction model for identities; and
 dynamically modifying the static access rule prediction model based on the sets of access rules extracted for the one or more identities from the identity to role binding data and role to access rules data collected from the multiple clusters.

12. The one or more computer storage media of claim 8, where the step of generating an identity misconfiguration alert when there is a difference between the set of access rules for the requested role to the predicted set of access rules for the requested identity includes:
 automatically reconfiguring the access rules for the requested identity.

13. The one or more computer storage media of claim 8, where the step of generating an identity misconfiguration alert when there is a difference between the set of access rules for the requested role to the predicted set of access rules for the requested identity comprises:
 providing a message for display that indicates that the access rules for the requested identity may be misconfigured.

14. The one or more computer storage media of claim 13, where the message provided for display indicates the difference between the set of access rules for the requested role and the predicted set of access rules for the requested identity.

15. A system for detection of identity misconfiguration in a remote computing resource provider system, the system comprising:
 one or more hardware processors; and
 one or more memory devices in communication with the one or more processors, the memory devices having computer-readable instructions stored thereupon that, when executed by the processors, cause the processors to perform a method comprising:
 collecting identity to role binding data and role to access rules data from multiple clusters supported by the remote computing resource provider system;
 for each of one or more identities in the collected identity to role binding data, extracting a set of access rules for each identity from the identity to role binding data and role to access rules data collected from the multiple clusters;
 creating an access rule prediction model from the sets of access rules extracted for the one or more identities from the identity to role binding data and role to access rules data collected from the multiple clusters to predict access rules for identities;
 receiving an identity definition request for a tenant, the identity definition request having a requested identity and a role assigned to the identity;
 obtaining a set of access rules for the role assigned to the identity;
 obtaining a predicted set of access rules for the requested identity from the access rule prediction model;
 comparing the set of access rules for the requested role to the predicted set of access rules for the requested identity;
 determining that there is a difference between the set of access rules for the requested role and the predicted set of access rules for the requested identity;
 based on determining that there is the difference between the set of access rules for the requested role and the predicted set of access rules for the requested identity, generating an identity misconfiguration alert that identifies the difference between the set of access rules for the requested role and the predicted set of access rules for the requested identity; and
 based on generating the identity misconfiguration alert, reconfiguring the requested identity using the predicted set of access rules for the requested identity.

16. The system of claim 15, where the step of creating an access rule prediction model from the sets of access rules extracted for the one or more identities from the identity to role binding data and role to access rules data collected from the multiple clusters to predict access rules for identities comprises:
 statistically analyzing the sets of access rules extracted for the one or more identities from the identity to role binding data and role to access rules data collected from the multiple clusters to create a statistical access rule prediction model to statistically predict access rules for identities.

17. The system of claim 15, where the step of creating an access rule prediction model from the sets of access rules extracted for the one or more identities from the identity to role binding data and role to access rules data collected from the multiple clusters to predict access rules for identities comprises:
 applying machine learning to the sets of access rules extracted for the one or more identities from the identity to role binding data and role to access rules data collected from the multiple clusters to create a machine learning access rule prediction model to predict access rules for identities.

18. The system of claim 17, where the step of applying machine learning to the sets of access rules extracted for the one or more identities from the identity to role binding data and role to access rules data collected from the multiple clusters to create a machine learning access rule prediction model to predict access rules for identities comprises:
 obtaining a static access rule prediction model for identities; and
 dynamically modifying the static access rule prediction model based on the sets of access rules extracted for the one or more identities from the identity to role binding data and role to access rules data collected from the multiple clusters.

19. The system of claim 15, where the step of generating an identity misconfiguration alert when there is a difference between the set of access rules for the requested role to the predicted set of access rules for the requested identity includes:
 automatically reconfiguring the access rules for the requested identity.

20. The system of claim 15, where the step of generating an identity misconfiguration alert when there is a difference between the set of access rules for the requested role to the predicted set of access rules for the requested identity comprises:

providing a message for display that indicates that the access rules for the requested identity may be misconfigured and indicates the difference between the set of access rules for the requested role and the predicted set of access rules for the requested identity.

* * * * *